United States Patent
Curcio, Jr. et al.

(10) Patent No.: US 8,571,048 B2
(45) Date of Patent: Oct. 29, 2013

(54) DYNAMIC MEMORY QUEUE DEPTH ALGORITHM

(75) Inventors: Joseph A. Curcio, Jr., Folsom, CA (US); Leonard Knapp, Loomis, CA (US); Manfred R. Arndt, Folsom, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1423 days.

(21) Appl. No.: 11/742,573

(22) Filed: Apr. 30, 2007

(65) Prior Publication Data

US 2008/0267203 A1    Oct. 30, 2008

(51) Int. Cl.
*H04L 12/28* (2006.01)
*H04L 12/56* (2011.01)

(52) U.S. Cl.
USPC .......................................................... 370/412

(58) Field of Classification Search
None
See application file for complete search history.

(56) References Cited

U.S. PATENT DOCUMENTS

| | | | |
|---|---|---|---|
| 6,633,835 B1* | 10/2003 | Moran et al. | 702/190 |
| 6,738,371 B1* | 5/2004 | Ayres | 370/352 |
| 6,738,386 B1* | 5/2004 | Holmqvist | 370/412 |
| 2001/0026535 A1* | 10/2001 | Amou et al. | 370/235 |
| 2001/0030974 A1* | 10/2001 | Pauwels | 370/444 |
| 2002/0056025 A1* | 5/2002 | Qiu et al. | 711/133 |
| 2004/0032830 A1* | 2/2004 | Bly et al. | 370/235 |
| 2004/0264500 A1* | 12/2004 | Bansal et al. | 370/468 |
| 2006/0050723 A1* | 3/2006 | Yu | 370/412 |
| 2006/0164979 A1* | 7/2006 | Pirbhai et al. | 370/229 |
| 2006/0221974 A1* | 10/2006 | Hilla et al. | 370/394 |

* cited by examiner

*Primary Examiner* — Minh-Trang Nguyen

(57) ABSTRACT

A method of modifying a priority queue configuration of a network switch is described. The method comprises configuring a priority queue configuration, monitoring a network parameter, and adjusting the priority queue configuration based on the monitored network parameter.

20 Claims, 6 Drawing Sheets

DYNAMIC MEMORY QUEUE DEPTH ALGORITHM

BACKGROUND

Prior approaches for network devices use fixed queue depths. At startup time, the network device executes instructions to configure each of a set of priority queues with a predetermined number of bytes of storage, i.e., a set allocation of memory is obtained at startup for operation of the network device.

If the allocated memory storage, i.e., a priority queue of the network device, is not used because the network traffic at the network device is not segmented into all eight ("8") priority levels, the unused allocated memory space is unavailable to priority queues.

DESCRIPTION OF THE DRAWINGS

One or more embodiments are illustrated by way of example, and not by limitation, in the figures of the accompanying drawings, wherein elements having the same reference numeral designations represent like elements throughout and wherein.

DETAILED DESCRIPTION

Figure 1:
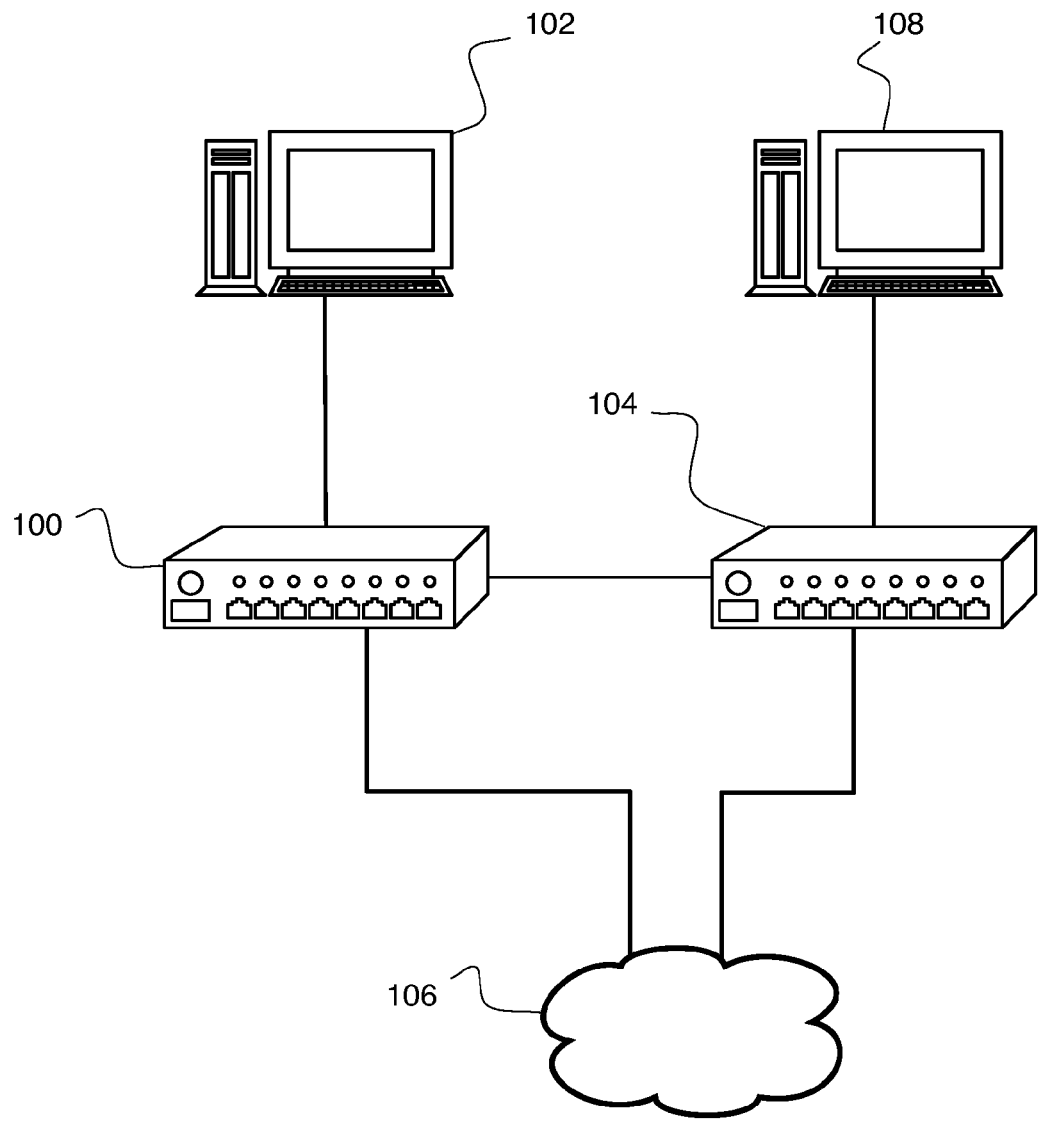
FIG. 1 is a high-level block diagram of a network in which an embodiment may be used to advantage.

FIG. 1 depicts a high-level block diagram of a network switch 100 communicatively coupled with a network device 102, e.g., a computer system, or other networkable processing device, another network switch 104, and a network 106, e.g., an interconnected network of network-connected devices. Network switch 104, in turn, is communicatively coupled with another network device 108. Network switch may be a communication switch, hub, router, or other device for routing network traffic. For clarity and ease of explanation, a single network device 102, a single network switch 104, and a single network 106 are depicted as communicatively coupled with network switch 100. In at least some embodiments, network switch 100 may be communicatively coupled with one or more of each of network device 102, network switch 104, and network 106.

Network switch 100 routes or forwards received traffic, comprising one or more packets of information, from an input port to an output port. For example, network switch 100 routes traffic, destined for network device 108, received from network device 102 to network switch 104 for delivery to the destination network device. In at least some embodiments, network switch 100 routes or forwards traffic received from network device 102, network switch 104, and network 106 to one or more of the network device, the other network switch, and the network.

Figure 2:
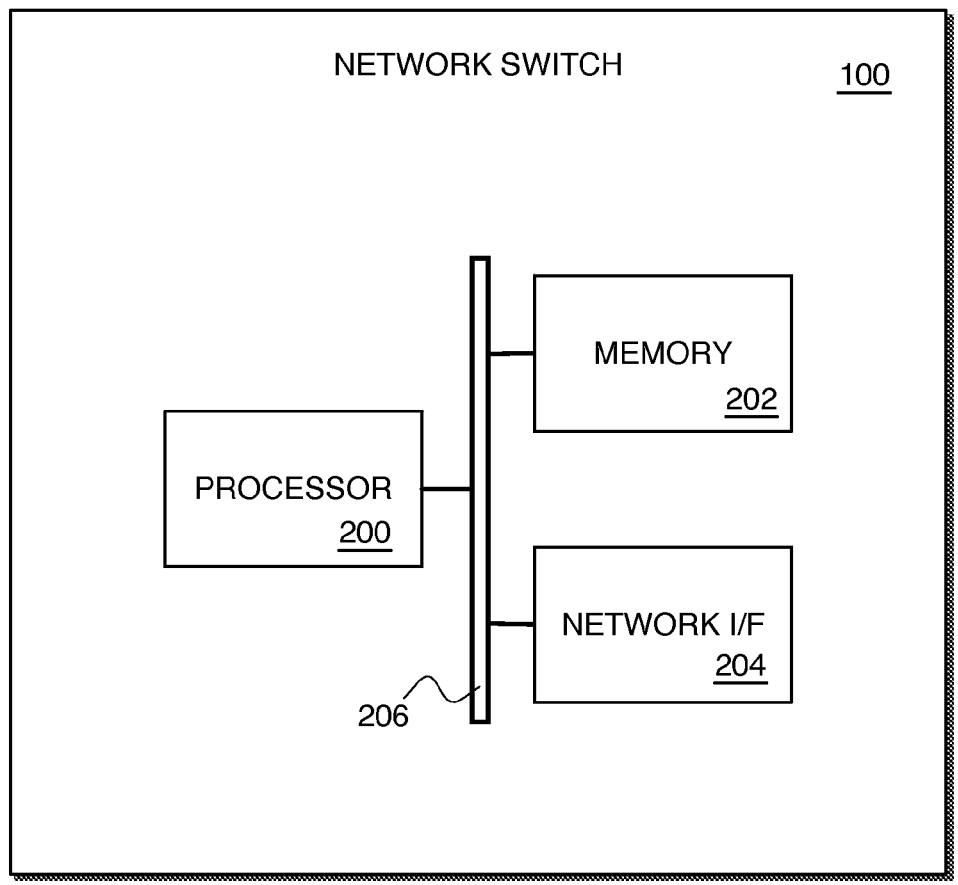
FIG. 2 is a high-level functional block diagram of a network switch according to an embodiment.

FIG. 2 depicts a high-level functional block diagram of network switch 100 in conjunction with which an embodiment may be implemented. Network switch 100 comprises a processor 200 for executing instructions, a memory 202 for storing information and a set of instructions for execution by the processor, and a network interface 204 for transmitting and receiving network traffic. Network switch 100 further comprises a bus 206 communicatively coupling processor 200, memory 202, and network interface 204. In at least some embodiments, memory 202 may be a volatile storage device, e.g., a random access memory (RAM) or other dynamic storage device, or a non-volatile storage device, e.g., a read only memory (ROM) or other static storage device, coupled to bus 206. According to an embodiment, network switch 100 operates in response to processor 200 executing sequences of instructions contained in memory 202 or received from network interface 204. Such instructions may be read into memory 202 from another readable medium, e.g., a computer-readable medium. In at least some embodiments, hard-wired circuitry may be used in place of or in combination with instructions to implement one or more embodiments.

Network switch 100 also comprises network interface 204 coupled to bus 206. Network interface 204 provides two-way data communication. In at least some embodiments, network interface 204 may be a wired and/or a wireless communication link. In at least some embodiments, network switch 100 comprises one or more network interfaces 204. For clarity and ease of explanation, only a single network interface 204 is described in conjunction with network switch 100. In at least some embodiments, network switch 100 comprises a network interface 204 corresponding to each port of the network switch.

Figure 3:
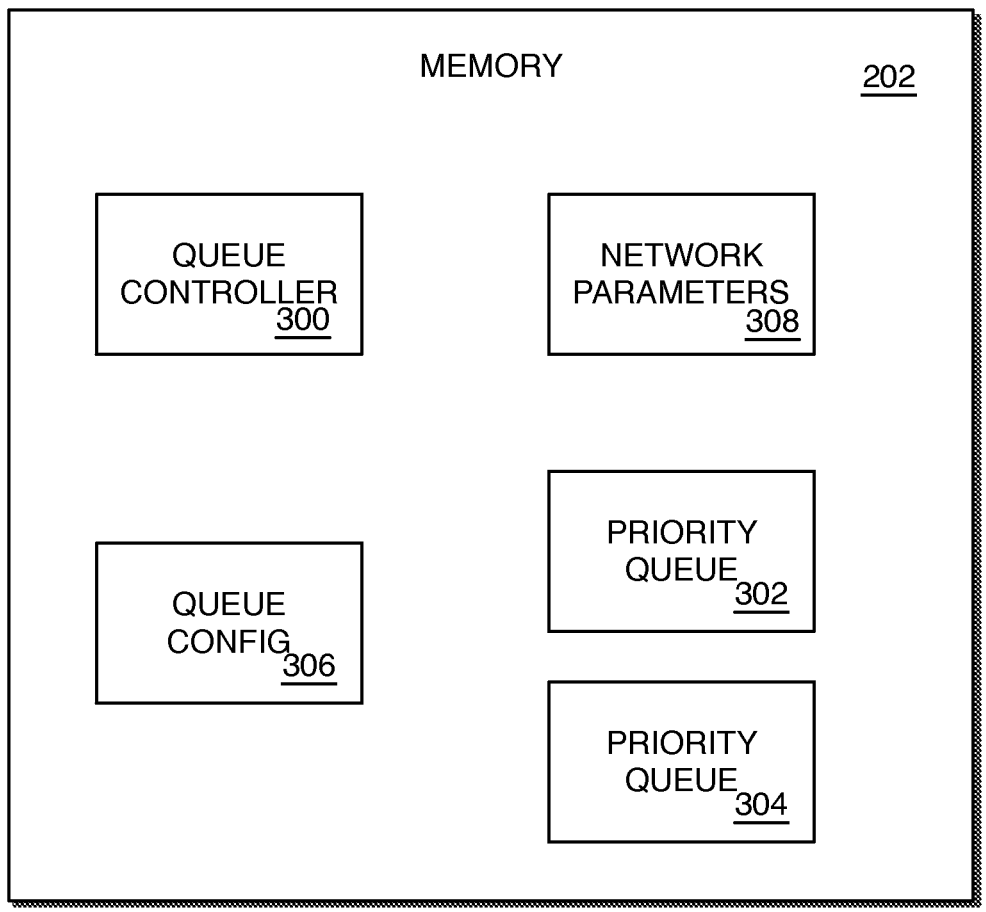
FIG. 3 is a functional block diagram of a memory according to an embodiment.

FIG. 3 depicts a functional block diagram of a portion of memory 202 of network switch 100 according to an embodiment. Memory 202 comprises a queue controller 300, i.e., a set of executable instructions which, when executed by processor 200, cause operation of network switch 100 according to an embodiment.

Memory 202 further comprises a first priority queue 302 and a second priority queue 304 for storing one or more received packets of network traffic, based on a priority level of the traffic, prior to the network switch transmitting the packet. In at least some embodiments, memory 202 comprises more than two priority queues. In at least one embodiment, memory 202 comprises eight ("8") priority queues.

In at least some embodiments, network switch 100 comprises a set of input traffic priority queues and a set of output traffic priority queues. As packets are received by network switch 100, the packets comprise an attribute such as a priority tag enabling the network switch to determine the packet priority, e.g., low latency traffic, bulk traffic, etc. After receipt and determination of the priority of the packets, network switch 100 stores the received packets in an input priority queue and then stages the packet to traverse the switch fabric and transfers the packet to an output priority queue. In at least some embodiments, a shared internal or external memory is used for storing one or more input and output priority queues. In at least some embodiments, the priority queues are configured at switch 100 startup. In at least some embodiments, network switch 100 applies the present embodiments in order to dynamically adjust the maximum depth of the priority queues to provide an improved a customer performance per traffic class with respect to unmodified priority queue depths.

For clarity and ease of explanation, two priority queues are described in conjunction with memory 202. In a given embodiment, first priority queue 302 is assigned a higher priority value than second priority queue 304. For example, network switch 202 transmits a packet enqueued to first priority queue 302 prior to transmitting a packet from the second priority queue 304.

Queue controller 300 controls one or more parameters, e.g., the size (or depth) of each priority queue, of first priority queue 302 and second priority queue 304. Each priority queue comprises a number of storage slots in which processor 200 stores received traffic, e.g., network packets, prior to transmission. The number of storage slots, e.g., memory space, allocated to a particular priority queue is referred to as a priority queue depth. In at least some embodiments, queue controller 300 determines the depth of a particular priority queue in order to optimize network switch 100 performance based on a particular priority level needed. For example, network traffic at a particular priority level indicating bulk transfer of data uses a deeper priority queue depth than, for example, a real time application. Based thereon, queue controller 300 configures the priority queue storing bulk transfer priority level traffic to have a greater maximum queue depth than the priority queue storing real time priority level traffic for transmission. In at least some embodiments, queue controller 300 configures the priority queue depth of each priority queue 302, 304 in order to balance the particular traffic and delivery needs of network switch 100.

In at least some embodiments, queue controller 300 may set a minimum priority queue depth. In at least some embodiments, queue controller 300 may set a minimum and a maximum priority queue depth.

In at least some embodiments, queue controller 300 is arranged to configure the depth of the priority queues 302, 304 on at least one of a per port basis, a per user basis, and a per switch basis. For example, queue controller 300 configures the priority queue depth for a priority queue corresponding to a particular port of network switch 100. In at least some embodiments, queue controller 300 configures the priority queue depth for a priority queue corresponding to a particular user connected to network switch 100. For example, queue controller 300 may assign a particular number of priority queues per user.

In at least some embodiments, queue controller 300 configures the priority queue depth for a priority queue corresponding to a particular flow of communication between two connected entities, e.g., from an application executed by network device 102 to another application executed by another network device connected to network switch 100. In a particular embodiment, the per flow configuration may be based on a 5-tuple of information comprising, for example, an internet protocol (IP) source address/destination address (SA/DA), the communication protocol used, and the level four networking layer source port and destination port.

In at least some embodiments, queue controller 300 configures the priority queue depth for a priority queue corresponding to a particular stream of communication, e.g., based on a hash of fields for discriminating the network traffic, e.g., the above-mentioned 5-tuple.

Memory 202 further comprises one or more queue configurations 306 which correspond to a particular set of one or more parameters for each of first priority queue 302 and second priority queue 304. For example, queue controller 300, in at least some embodiments, may store one or more particular parameters of one or each of first priority queue 302 and second priority queue 304 for reuse at a future time. Additionally, in at least some embodiments, queue controller 300 may select from one or more predetermined set of parameters, e.g., a particular predetermined queue configuration, to apply to one or a combination of the priority queues 302, 304. In at least some embodiments, queue controller 300 does not store queue configuration 306.

Memory 202 further comprises one or more network parameters 308 upon which queue controller 300 may modify a particular priority queue configuration. In at least some embodiments, network parameters 308 may comprise one or more traffic priorities, time samples, a history of previous priority levels, network resources available, etc. In at least some embodiments, network parameters 308 may comprise a history of queue latency, a queue fill percentage peak and/or average value, a packet drop rate, packet arrival rate, packet sizes, and/or queue overfill rate or duration. In at least some embodiments directed to adjusting maximum priority queue depth with respect to bulk traffic transfer, larger queue depths may be used in contrast to real-time network transfers. In at least some embodiments directed to adjusting maximum priority queue depth with respect to real-time applications, low latency and low jitter which correspond to smaller maximum priority queue depths may be used in contrast to bulk traffic transfers.

Figure 4:
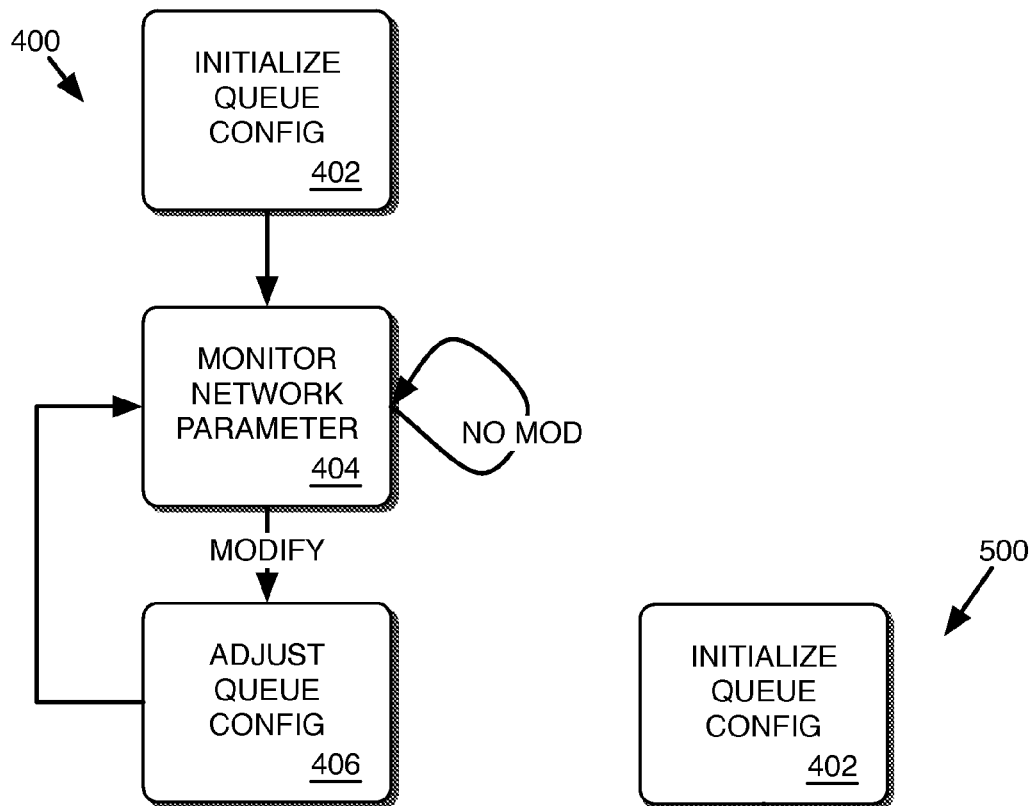
FIG. 4 is a high-level process flow diagram of a method according to an embodiment.

FIG. 4 depicts a high-level process flow diagram of at least a portion 400 of a method of operation of queue controller 300 according to an embodiment. The flow begins at initialize queue configuration functionality 402 wherein queue controller 300 configures first priority queue 302 and second priority queue 304 according to a nominal or default queue depth. In at least some embodiments, execution of queue controller 300 by processor 200 causes the processor to configure first priority queue 302 and second priority queue 304 according to queue configuration 306.

The flow proceeds to monitor network parameter functionality 404 wherein execution of queue controller 300 causes processor 200 to read one or more network parameters 308 and determine whether to modify the configuration of either or both of first priority queue 302 and second priority queue 304. If the result of the determination is negative ("NO MOD"), the flow returns to monitor network parameter functionality 404 and execution of queue controller 300 causes processor 200 to continue to monitor the one or more network parameters.

If the result of the determination is positive ("MODIFY"), the flow proceeds to adjust queue config functionality 406 wherein execution of queue controller 300 causes processor 200 to modify the configuration of either or both of first priority queue 302 and second priority queue 304. For example, queue controller 300 may increase and/or decrease the depth of one or both of the priority queues 302, 304. The flow then proceeds to return to monitor network parameter functionality 404.

Figure 5:
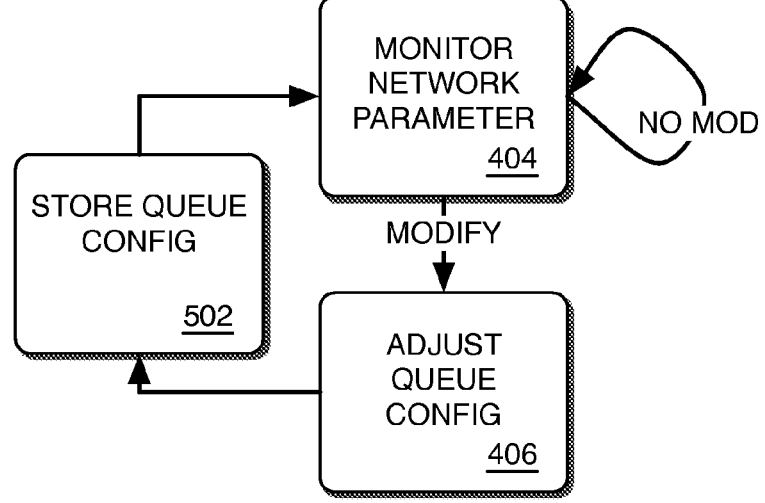
FIG. 5 is a high-level process flow diagram of another method according to another embodiment.

FIG. 5 depicts a high-level process flow diagram of at least a portion 500 of another method of operation of queue controller 300 according to another embodiment. Similar to the FIG. 4 embodiment, the flow proceeds as described above with respect to functionality 402, 404, and 406. FIG. 5 differs, however, in that after adjusting the configuration of a priority queue 302, 304, the flow proceeds to store queue config functionality 502 wherein queue controller 300 stores the new queue configuration in queue configuration 306. After completion of store queue config functionality 502, the flow proceeds to return to monitor network parameter functionality 404.

In at least some embodiments, a user connecting to network switch 100 may be provided with an option of one or more selections on which dynamic queue depth algorithm to prioritize. For example, the user may be provided with one or more algorithmic selection possibilities having differing goals (such as minimum latency/best effort throughput and/or best effort latency/optimal throughput, etc.)

Figure 6A:
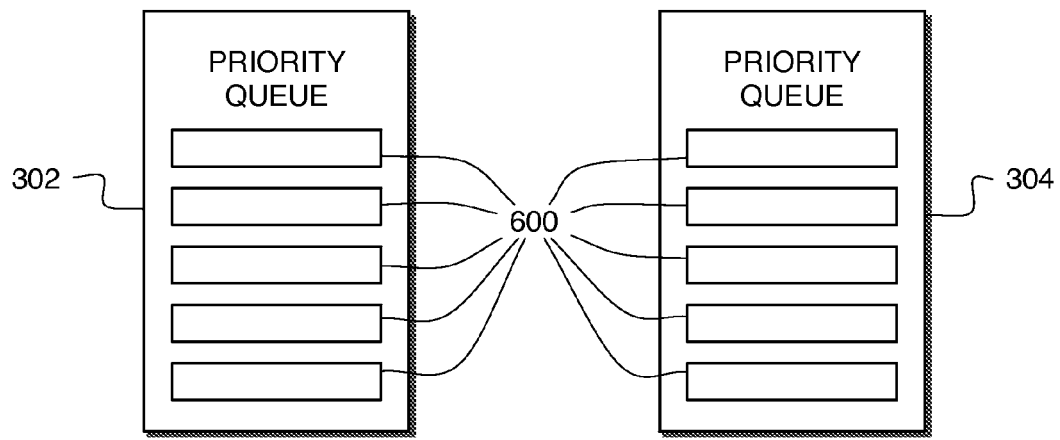
FIGS. 6a-6c are block diagrams of a state of priority queues according to an embodiment.
Figure 6B:
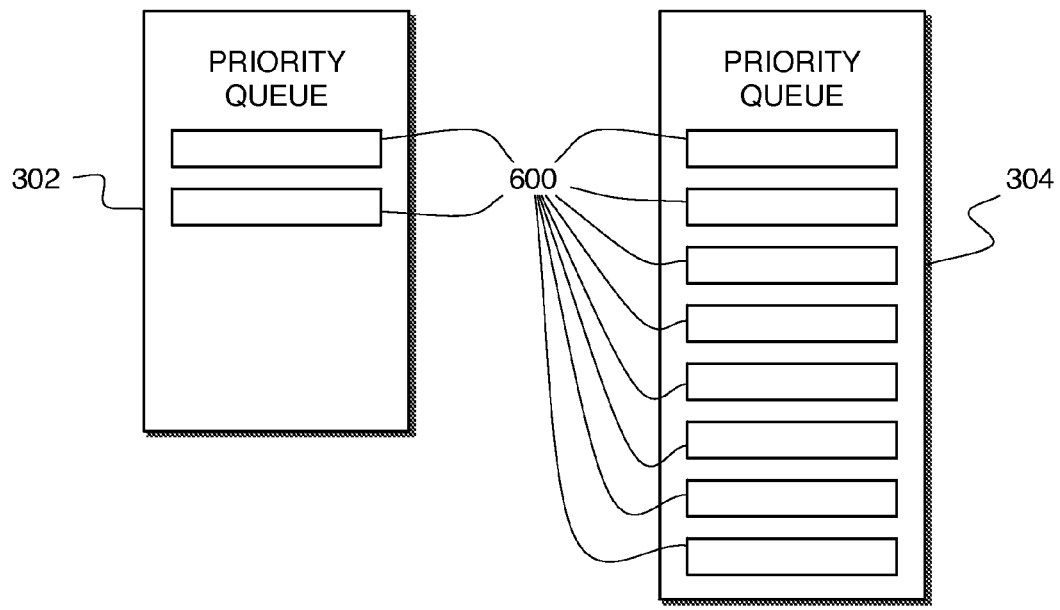
Figure 6C:
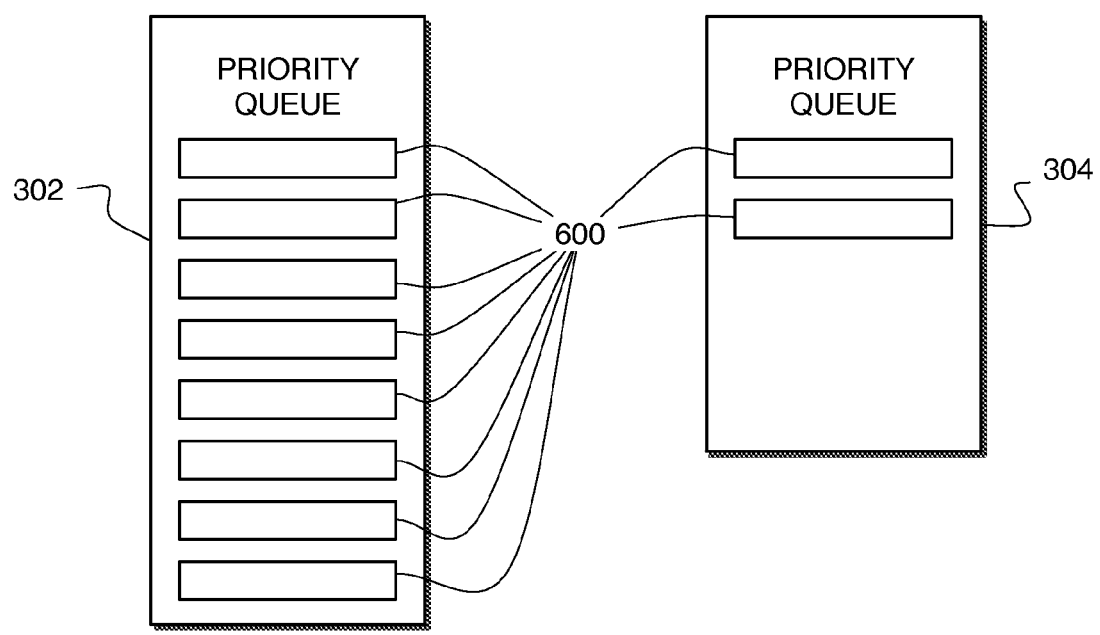

FIGS. 6a-6c depict block diagrams of states of first and second priority queues 302, 304. In particular, FIG. 6a depicts first and second priority queues 302, 304 each comprising an equal number of storage slots 600, i.e., the first and second priority queues comprise the same priority queue depth. In the FIG. 6a state, first and second priority queues 302, 304 each comprise five ("5") storage slots 600. In at least some embodiments, FIG. 6a depicts an initial, nominal state of first and second priority queues 302, 304, e.g., at system startup.

FIG. 6b depicts first priority queue 302 comprising a fewer number of storage slots 600 with respect to second priority queue 304. For example, according to an embodiment, queue controller 300 may adjust (FIG. 4, 406) the allocation of storage slots 600 as between first and second priority queues 302, 304 in order to assign second priority queue 304 a greater priority queue depth based on one or more network parameters 308.

FIG. 6c depicts first priority queue 302 comprising a greater number of storage slots 600 with respect to second priority queue 304. For example, according to an embodiment, queue controller 300 may adjust (FIG. 4, 406) the allocation of storage slots 600 as between the first and second priority queues 302, 304 in order to assign first priority queue 302 a greater priority queue depth based on one or more network parameters 308.

What is claimed is:

1. A method of modifying a priority queue configuration of a network switch, comprising:
    configuring a priority queue configuration, wherein the priority queue configuration comprises a set of prioritized input queues and a set of prioritized output queues;
    monitoring, by a processor, a network parameter; and
    dynamically adjusting, by the processor, the priority queue configuration based on the monitored network parameter, wherein adjusting comprises at least one of increasing a priority queue depth and decreasing a priority queue depth, and wherein all of said queues are subject to size adjustment.

2. The method as claimed in claim 1, wherein configuring comprises initializing the priority queue configuration.

3. The method as claimed in claim 1, wherein configuring comprises configuring the priority queue configuration based on a predetermined priority queue configuration.

4. The method as claimed in claim 1, wherein monitoring comprises monitoring at least one of a network traffic priority and a network resource availability.

5. The method as claimed in claim 1, further comprising: storing the adjusted priority queue configuration to a memory.

6. The method as claimed in claim 5, further comprising configuring a priority queue configuration based on the adjusted priority queue configuration stored in the memory.

7. The method as claimed in claim 1, wherein the adjusting is performed on at least one of a per port basis and a per switch basis.

8. The method as claimed in claim 1, wherein the monitored network parameter comprises at least one of a history of previous priority levels, a history of queue latency, a queue fill percentage peak or average, a packet drop rate, packet sizes and a queue overfill rate or duration.

9. A system for modifying a priority queue configuration of a network switch, the system comprising:
    a processor; and
    a memory communicatively coupled with the processor, the memory storing two or more priority queues and a queue controller comprising a set of executable instructions,
    wherein the queue controller is to cause the processor to dynamically adjust a size of at least one of the two or more priority queues based on a monitored network parameter;
    wherein the two or more priority queues comprises a set of prioritized input queues and a set of prioritized output queues, all of said queues being subject to size adjustment by the processor.

10. The system as claimed in claim 9, wherein the memory further stores the network parameter.

11. The system as claimed in claim 9, wherein the queue controller is further to cause the processor to monitor the network parameter.

12. The system as claimed in claim 9, wherein the network parameter comprises at least one of a network traffic priority and a network resource availability.

13. The system as claimed in claim 9, wherein the memory further stores a queue configuration; and
    wherein the queue controller is further to cause the processor to configure the two or more priority queues based on the stored queue configuration.

14. The system as claimed in claim 9, wherein the queue controller is configured to adjust the size of at least one of the priority queues on at least one of a per port basis, a per switch basis, a per user basis, a per flow basis, and a per stream basis.

15. A non-transitory computer readable medium storing instructions which, when executed by a processor, cause the processor to:
    configure a priority queue configuration, wherein the priority queue configuration comprises a set of prioritized input queues and a set of prioritized output queues;
    monitor a network parameter; and
    dynamically adjust a size of at least one of two or more priority queues in the priority queue configuration based on the monitored network parameter subject to a minimum priority queue depth specified for at least one of said two or more priority queues.

16. The non-transitory computer readable medium as claimed in claim 15, wherein the instructions further comprise instructions to cause the processor to configure the priority queue configuration based on a predetermined priority queue configuration stored in the non-transitory computer readable medium.

17. The non-transitory computer readable medium as claimed in claim 15, wherein the instructions further comprise instructions to cause the processor to monitor at least one of a network traffic priority and a network resource availability.

18. The non-transitory computer readable medium as claimed in claim 15, wherein the instructions comprise instructions to cause the processor to perform at least one of increasing a priority queue depth and decreasing a priority queue depth on at least one of a per port basis or a per switch basis.

19. The non-transitory computer readable medium as claimed in claim 15, wherein the instructions comprise instructions to cause the processor to perform the adjusting the size of at least one of the two or more priority queues a per user basis.

20. The non-transitory computer readable medium as claimed in claim 15, wherein the instructions comprise instructions to cause the processor to allocate a first of said priority queues to bulk level traffic and a second of said priority queues to a real-time application.

* * * * *